Aug. 6, 1935.　　　　S. S. GROTTA　　　　2,010,777
AUTOMATIC CONTROL MECHANISM FOR GLASS FEEDING APPARATUS
Filed July 30, 1932
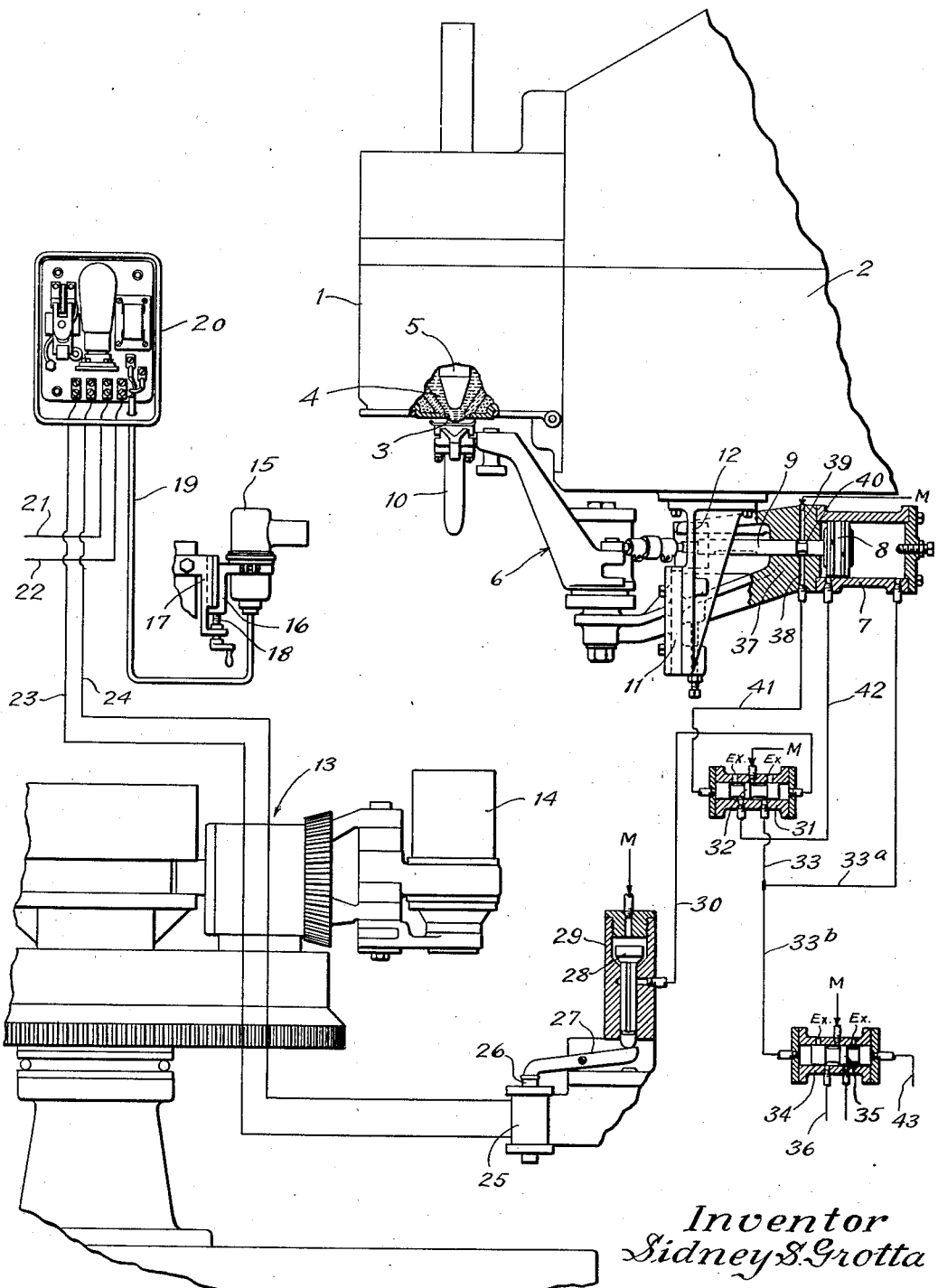
Witness:
A. A. Horn
Inventor
Sidney S. Grotta
by Brown & Parham
Attorneys.

Patented Aug. 6, 1935

2,010,777

UNITED STATES PATENT OFFICE

2,010,777

AUTOMATIC CONTROL MECHANISM FOR GLASS FEEDING APPARATUS

Sidney S. Grotta, Hartford, Conn., assignor to Hartford-Empire Company, Hartford, Conn., a corporation of Delaware Application July 30, 1932, Serial No. 626,252

2 Claims. (Cl. 49—55)

This invention relates to the regulation or control of glass feeding apparatus for feeding molten glass in successive pendant or freely hanging mold charge masses, and for severing a mold charge from each of such masses.

It is desirable that a feeder of the type above referred to should deliver substantially uniform mold charges. In practice, operating conditions are constantly subject to disturbances on account of changes in temperature within the glass feeding apparatus and/or within the tank furnace from which the feeding apparatus receives molten glass. Also, any change of head pressure in the glass feeding apparatus or fluctuation in the motive power by which the operating parts of the feeder are driven may affect the control of the mold charges delivered by the feeding apparatus. For these and other reasons, it is difficult to keep uniform the mold charges delivered by the feeding apparatus.

Any substantial change, either in the temperature of the glass issuing from the feeding apparatus or in the rate of issuance of glass from the feeding apparatus, manifests itself in a change in the pendant mold charge mass produced, and particularly in the length thereof. Thus, if the temperature of the glass is increased, the attendant change of viscosity will cause the production of a longer mold charge mass in a given period of time. Conversely, if the glass becomes slightly cooler, the pendant mold charge mass produced in a given time will be shorter than the normal length. If the shears or severing means are operated with constant frequency, the charges delivered may vary in length and the weight of the individual charges likewise may vary.

The factors causing such differentials between the individual mold charges produced may act gradually and may not be readily perceptible or quickly observed by the attendant or operator of the glass feeding mechanism, and therefore corrective adjustments may not be made until a considerable number of charges which vary among themselves has been delivered.

An object of the present invention is to provide simple but reliable and effective means for automatically causing severance of a mold charge from each of the pendant mold charge masses which are successively produced by a glass feeding apparatus whenever that mold charge mass has attained a predetermined but adjustable length, irrespective of the duration of the period of formation or production of such mold charge mass.

A further object of the invention is to provide a control mechanism of the character described which will afford facilities for controlling the operation of an associate forming machine so that the operations of the latter will be suitably synchronized with the charge delivering operations of the feeding apparatus.

Other objects and advantages of the invention will hereinafter be pointed out or will become apparent from the following description of a practical embodiment of the invention as illustrated in the accompanying drawing.

The accompanying drawing is a view mainly in elevation but partly in vertical section, showing a practical embodiment of the invention applied to a glass feeding apparatus and to the trip-off valve for an associate forming machine, the view being largely diagrammatic and only such portions of the glass feeding apparatus and forming machine being shown as are believed to be necessary or desirable for an understanding of the invention.

In the drawing, a glass feeding forehearth 1 is appurtenant to a tank furnace 2 and is provided with a glass feeding outlet 3 in its bottom. The outlet 3 is submerged by molten glass 4 in the forehearth. The issuance of glass from the outlet 3 may be controlled by a normally stationary but vertically adjustable discharge regulating implement 5, or in any other suitable known manner.

Mechanism for severing mold charges from successive pendant masses of issued glass at a plane below and spaced from the lower end of the feeder outlet is designated generally at 6. This severing mechanism may be of any suitable known type of construction, many examples of which are well known in the art, and therefore has not been illustrated in detail and need not be particularly described. It is believed to be sufficient for an understanding of the present application to state that this severing mechanism includes pneumatic operating means comprising a cylinder 7, a piston 8 reciprocable in the cylinder, and a piston rod 9 connecting the piston 8 operatively with movable parts of the severing mechanism, so that the severing mechanism will function to sever a mold charge, such as indicated at 10, from a pendant mold charge mass beneath the outlet 3 when the piston 8 is at the forward end of the cylinder 7, as shown in the drawing. When the piston 8 has been moved to the opposite or rearward end of the cylinder 7, the severing mechanism will be actuated to open the severing blades or elements thereof so as to permit the formation of a new pendant mold charge mass.

The severing mechanism, including the operating means therefor, may be adjusted vertically, as by being carried by a slide 11 which may be adjusted vertically on the supporting bracket 12, whereby the plane of severance of the mold charges may be varied with respect to the plane of the lower end of the outlet.

A forming machine, designated generally at 13, is partly shown in the drawing and may be of the intermittently operated type of construction. Such forming machine will present molds, such as that indicated at 14, in turn at the proper place to receive the charges delivered by the feeding apparatus.

The parts which have been described so far are all well known in the art and may be of any suitable known types of construction and operate in any suitable manner.

In carrying the invention into effect, I may provide a photo-electric unit 15 carried by a slide 16 which may be adjusted vertically in a slideway on a supporting bracket 17, as by the adjusting screw 18, so that the photo-electric cell (not shown) of this unit will be energized whenever the lower end of a pendant mold charge mass produced by the feeding apparatus 1 has reached a predetermined level below the feeder outlet. The photo-electric unit 15 has a suitable operative connection, indicated at 19, with a photo-electric relay unit 20. Electrically conducting leads or power lines 21 and 22 connect the relay unit 20 operatively with any suitable source of electric current supply. Electric current delivery lines 23 and 24 connect the relay unit 20 operatively with a solenoid 25.

The photo-electric unit 15 and the photo-electric relay unit 20 may be purchased as an assembly or entity and are well known in the art. They therefore need not be illustrated in detail or further described. It is sufficient to state that when the photo-electric unit is energized by the reception of light rays from the lower end of a pendant mold charge mass, when the latter has attained a length which may be predetermined by adjustment of the level of the photo-electric unit, an electric circuit will be closed which will energize the solenoid 25 and will cause the core 26 of that solenoid to be retracted downwardly to the position shown in the drawing.

The solenoid core 26 is operatively connected with a lever 27 which will function to lift the movable valve member 28 of a timing valve 29 when the solenoid has been energized. Air under pressure, supplied to the chamber of the valve 29 by the associate main M, will pass from that valve chamber around the raised valve 28 and through an air delivery line 30 to one end of a control valve 31. The movable valve member 32 of the control valve 31 will be shifted in the casing of that valve to the position shown in the drawing so that air under pressure from the associate main M may pass from the valve 31 through a delivery line 33. The delivery line 33 includes the branches 33a and 33b. The branch 33a leads to the outer end of the aforesaid cylinder 7 of the operating means for the shear mechanism.

Application of air from the line 33a to the outer end of the cylinder 7 will cause movement of the piston 8 to the position shown in the drawing and severance by the severing mechanism of a mold charge from the pendant mold charge mass. It thus will be observed that whenever the photo-electric cell "sees" the lower end of a pendant mold charge mass, the severing mechanism will be actuated to sever a mold charge from that mass, irrespective of the duration of the period of formation of that pendant mold charge mass and irrespective of the time that has elapsed since the severance of the preceding mold charge.

The branch line 33b leads to one end of a trip-off valve 34 for the associate forming machine. The application of air to the valve 34 by the line 33b will cause movement of the movable valve member 35 of the valve 34 to the position shown in the drawing, so that air from the associate main M will pass from the valve 34 through a line 36. The line 36 may be operatively connected with mechanism (not shown) of the associate forming machine 13 so as to initiate a cycle or period of operating movements of the latter, including the presentation of a mold of the forming machine at the proper place to receive a severed charge.

The movement of the piston 8 to the forward end of the cylinder 7 to effect forward projection of the piston rod 9 and a charge severing action of the severing mechanism will open a passage for supplying air under pressure to the opposite or forward end of the control cylinder 31. As shown in the drawing, the forward head of the cylinder 7 is enlarged so as to provide a sleeve 37 through which a portion of the piston rod 9 slides. Aligned passages 38 and 39 are formed in the sleeve 37. The inner or adjacent ends of these passages communicate with an annular groove 40 in the piston rod 9 when the piston 8 is at the forward end of its stroke. The passage 39 is connected with an associate air supply main, while the passage 38 is connected by an air line 41 with the second or forward end of the control cylinder 31. Consequently, when the piston 8 has reached the forward end of the cylinder 7 and has caused a charge severing operation by the severing mechanism, air will be applied to the forward end of the control cylinder 31 by the line 41 and will cause a return movement of the movable valve member 32 of the valve 31.

When the latter reaches the end of the valve 31 opposite to that in which it is disposed in the drawing, air from the associate main M may pass through a line 42 to the forward end of the cylinder 7 and cause a return movement of the piston 8. The return movement of the piston 8 will open the severing mechanism, as hereinbefore has been explained. The exhaust openings of the valve 31 and of the valve 34 also are designated "Ex."

An air line 43 connects with the end of the trip-off cylinder 34 opposite that to which air is supplied by the line 33b. This line 43 may receive air at the proper time from a suitable operating part (not shown) of the associate forming machine, so as to cause a return movement of the movable valve member 35 of the trip-off valve 34 after such valve has been actuated by air from the line 33b to initiate a cycle or period of operations of the forming machine.

The manner in which the invention may be put to practical use will be readily understood. With the photo-electric unit adjusted to a predetermined level below the feeder outlet, such unit will be energized whenever the lower end of a pendant mold charge mass produced by the feeding apparatus reaches the level at which light therefrom will enter the photo-electric unit. The consequent actuation of the severing mechanism will effect severance of a mold charge from that pendant mold charge mass. The associate forming machine also will be actuated as a result of the actuation of the trip-off valve. The operation of the forming machine and of the glass feeding apparatus thus will be suitably synchronized. Charges of substantially uniform length thus will be severed by the successive severing operations of the severing mechanism, even though conditions involved in the production of the successive pendant mold charge masses may have changed to such an extent that the individual pendant mold charge masses are formed or produced in periods of time which differ among themselves.

The invention has been illustrated in the accompanying drawing as applied to a glass feeder having a stationary but adjustable means for controlling discharge of glass therefrom and to a trip-off valve for a forming machine of the intermittently operating type as probably the greatest utility of the invention is in an application to a glass feeding apparatus and an associate forming machine of these types. However, it is obvious that the invention may be applied usefully to other types of glass feeding apparatus and forming machines, and that many changes and modifications of the structures shown in the accompanying drawing and hereinbefore described in detail may be made without departing from the spirit and scope of the invention.

I claim:

1. The combination with glass feeding apparatus having a discharge outlet from which molten glass may issue and accumulate in successive suspended masses, of shears for severing mold charges from said masses, pneumatic mechanism for operating said shears, said pneumatic mechanism comprising a horizontal cylinder, a piston reciprocable therein, means connecting the piston and said shears so that movement of the piston to the forward end of the cylinder will close the shears to cut a mold charge from a suspended charge mass of molten glass and a return movement of the piston in said cylinder will open said shears, a control valve for controlling the supply and exhaust of pressure of fluid to and from the rearward and forward ends of said cylinder, a normally closed valve adapted when opened to supply operating fluid to said control valve to operate the latter so as to supply operating fluid pressure to the rearward end of said cylinder and to exhaust fluid pressure from the forward end of the cylinder, a photo-electric unit adjustably supported below and out of line with said outlet, said photo-electric unit being adapted to be energized when the lower end of each of said suspended mold charge masses of molten glass reaches the approximate level of said photo-electric unit, means adapted to act automatically in response to energization of said photo-electric unit to open said normally closed valve, and other normally closed valve means adapted to be opened automatically when said piston of the operating mechanism for the shears has been moved to the forward end of its cylinder, said last-named valve means being adapted when opened to supply pressure fluid to said control valve so as to operate the latter to supply pressure fluid to the front end of said cylinder and to exhaust pressure fluid from the rearward end of said cylinder.

2. The combination with glass feeding apparatus having a discharge outlet from which molten glass may issue and accumulate in successive suspended masses, of shears for severing mold charges from said masses, pneumatic mechanism for operating said shears, said pneumatic mechanism comprising a horizontal cylinder, a piston reciprocable therein, means connecting the piston and said shears so that movement of the piston to the forward end of the cylinder will close the shears to cut a mold charge from a suspended charge mass of molten glass and a return movement of the piston in said cylinder will open said shears, a trip-off valve for an associate forming machine, a control valve for controlling the supply and exhaust of pressure fluid to and from the rearward and forward ends of said cylinder and also to and from one end of said trip-off valve, a normally closed valve adapted when opened to supply operating fluid to said control valve to operate the latter so as to supply operating fluid pressure to the rearward end of said cylinder and to said trip-off valve and to exhaust fluid pressure from the forward end of the cylinder, a photo-electric unit adjustably supported below and out of line with said outlet, said photo-electric unit being adapted to be energized when the lower end of each of said suspended mold charge masses of molten glass reaches the approximate level of said photo-electric unit, means adapted to act automatically in response to energization of said photo-electric unit to open said normally closed valve, and other normally closed valve means adapted to be opened automatically when said piston of the operating mechanism for the shears has been moved to the forward end of its cylinder, said last-named valve means being adapted when opened to supply pressure fluid to said control valve so as to operate the latter to supply pressure fluid to the front end of said cylinder and to exhaust pressure fluid from the rearward end of said cylinder and from said trip-off valve.

SIDNEY S. GROTTA.